United States Patent [19]

Ozue

[11] Patent Number: 5,742,444
[45] Date of Patent: Apr. 21, 1998

[54] RECORDING AND/OR REPRODUCING APPARATUS FOR CONTROLLING THE RUNNING SPEED OF A RECORDING TAPE

[75] Inventor: Tadashi Ozue, Kanagawa, Japan

[73] Assignee: Sony Corporation, Tokyo, Japan

[21] Appl. No.: 379,557

[22] PCT Filed: Jun. 15, 1994

[86] PCT No.: PCT/JP94/00969

§ 371 Date: Mar. 22, 1995

§ 102(e) Date: Mar. 22, 1995

[87] PCT Pub. No.: WO94/29858

PCT Pub. Date: Dec. 22, 1994

[30] Foreign Application Priority Data

Jun. 15, 1993 [JP] Japan .................... 5-143307

[51] Int. Cl.[6] .................................. G11B 15/04
[52] U.S. Cl. .............. 360/60; 360/8; 360/73.05; 360/68; 360/61; 360/73.08
[58] Field of Search ............... 360/73.08, 73.07, 360/73.11, 60, 57, 8, 73.05, 73.06, 55, 31, 32, 72.2, 68, 61, 62, 64, 67

[56] References Cited

U.S. PATENT DOCUMENTS

| | | | |
|---|---|---|---|
| 4,758,899 | 7/1988 | Tsukiyama | 360/8 |
| 4,771,345 | 9/1988 | Watanabe | 360/8 |
| 5,045,954 | 9/1991 | Oishi | 360/8 |
| 5,086,358 | 2/1992 | Takei | 360/60 |
| 5,335,116 | 8/1994 | Onishi | 360/32 |
| 5,349,479 | 9/1994 | Arimura | 360/73.06 |

FOREIGN PATENT DOCUMENTS

| | | | |
|---|---|---|---|
| 150109 | 9/1982 | Japan | 360/70 |
| 57-205845 | 12/1982 | Japan | |
| 59-198553 | 11/1984 | Japan | |
| 4-134526 | 5/1992 | Japan | |
| 4-265557 | 9/1992 | Japan | |
| 5-198053 | 8/1993 | Japan | |

OTHER PUBLICATIONS

Sato, Yoichi, "Statistical Multiplicating Characteristics of Multimedia Signal in High–Speed Burst Multiple Transmitting System", IEICE Thesis Journal, vol. J72–B–I, No. 11, Nov., 1989 pp. 1112–1119.

"Nikkei Electrnics", pp. 147–155, published by Nikkei BP Co., Mar. 30, 1992.

*Primary Examiner*—Aristotelis M. Psitos
*Assistant Examiner*—Alan Faber
*Attorney, Agent, or Firm*—William S. Frommer; Alvin Sinderbrand

[57] ABSTRACT

An input data rate delivered from an external device and a recording rate at the recording system for recording data onto a recording tape by using a rotary head are compared at a rate comparison section, and a comparison result is sent to a control section. The control section controls a tape running drive section for allowing the recording tape to undergo running drive. This control section carries out a switching control such that when input rate is lower than recording rate, tape running speed is caused to undergo switching control so as to shift to a lower speed side and to reduce recording rate, and when input rate is higher than recording rate at the time of tape low speed running, tape running speed is caused to be in correspondence with original stationary speed for a second time. By adjustably controlling running speed of the recording tape in accordance with input data rate in a manner as described above, effective recording can be carried out in correspondence with data rate change while the number of rotations of rotary drum and recording/reproduction frequency are maintained to be fixed. When the data rate of the input data is less than a predetermined value, the control section effects thinning of the recording operation by the recording head for a predetermined period.

13 Claims, 9 Drawing Sheets

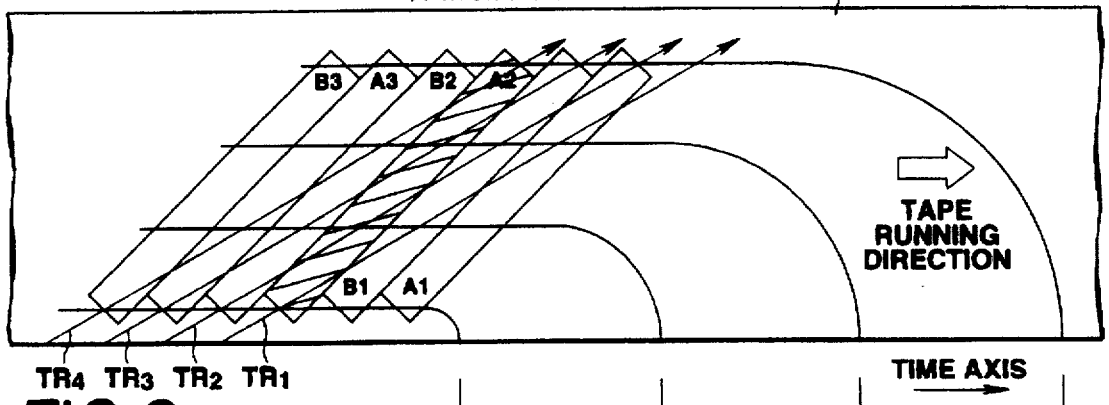

RECORDING AND/OR REPRODUCING APPARATUS FOR CONTROLLING THE RUNNING SPEED OF A RECORDING TAPE

DESCRIPTION

1. Technical Field

This invention relates to a recording apparatus adapted for recording digital input data onto a recording tape by using a rotary recording head, and a reproducing apparatus adapted for reproducing digital data recorded on the recording tape by using a rotary reproducing head.

2. Background Art

As a recording/reproducing apparatus such as a tape streamer, etc. adapted for recording and reproducing digital data, a recording/reproducing apparatus of the helical scan system adapted for obliquely carrying out scanning with respect to length direction of a recording tape such as a magnetic tape, etc. by rotary head is known. There are instances where such a recording/reproducing apparatus, e.g., a tape streamer, etc. is used as a data storage unit (device) or a data memory unit (device) for recording digital data outputted from an external equipment such as a personal computer, etc. onto a recording tape, and to reproduce data from the recording tape in the case where recorded data is required.

At the time of inputting digital data from an external device (unit) to such recording/reproducing apparatus to allow the recording/reproducing apparatus to store it, digital input data from the external device is once (temporarily) written into buffer memory to read out digital input data from the buffer memory when quantity of digital input data written in the buffer memory is above a predetermined value to record it onto the recording tape. Moreover, at the time of outputting digital data recorded by the recording/reproducing apparatus to external device, data reproduced from the recording tape is once (temporarily) written into buffer memory to read out digital data from the buffer memory when quantity of digital data written in the buffer memory is above a predetermined value to sent it to the external device.

Meanwhile, there are instances where, at the time of recording or reproducing data as described above, rate of digital data inputted and outputted to and from buffer memory of the recording/reproducing apparatus may change.

For example, in the case where rate of input data is higher than recording rate of recording tape at the time of recording data, external device stops data output and waits until digital data in buffer memory of the recording/reproducing apparatus is outputted, and quantity of digital data is less than a predetermined quantity.

On the contrary, in the case where rate of input data is lower than recording rate of the recording tape, the external device stops running of recording, and waits until quantity of digital data stored in the buffer memory becomes equal to a predetermined quantity. In this case, since recording head exceedingly runs with respect to recording position on the recording tape when running of the recording tape is caused to undergo stop (halt) operation, an operation called re-positioning, i.e., head position detecting operation to run the recording tape in an opposite direction to detect the recording position is carried out.

Moreover, in the case where rate of the input data is lower than recording rate of recording tape, such an approach is conceivable to stop running of recording tape as described above to continue sending dummy data to the recording tape until quantity of digital data recorded in buffer memory becomes equal to a predetermined quantity.

Meanwhile, in the case where rate of input data is lower than recording rate of recording tape, bad influence on the recording tape might take place by the above-mentioned re-positioning. At this time, if the recording tape is run without carrying out the re-positioning, useless data would be recorded onto the recording tape. Accordingly, capacity of the recording tape is decreased.

In addition, also at the time of reproduction of data, in the case where rate of output data is lower than reproduction speed of recording tape, such an approach would be employed to stop running of the recording tape to carry out re-positioning. Also in this case, useless time and/or bad influence on the recording tape as described above would take place.

This invention has been made in view of such actual circumstances, and its object is to provide a recording apparatus capable of recording data in accordance with change of input data rate by adjustably controlling running speed of recording tape in dependency upon input data, a reproducing apparatus capable of reproducing data in accordance with change of output data rate by adjustably controlling running speed of recording tape in dependency upon output data, and a recording/reproducing apparatus having such function.

DISCLOSURE OF THE INVENTION

A recording apparatus according to this invention comprises recording signal processing means for carrying out signal processing of input data so that a recording signal is provided, recording means for recording the recording signal from the recording signal processing means onto a recording tape by using a rotary head, tape running drive means for carrying out tape running control of the recording means, rate comparing means for comparing data rate of the input data and a data recording rate of the recording means, and speed adjustable control means for adjustably controlling running speed of the recording tape by the tape running drive means in dependency upon a comparison output from the rate comparing means.

Thus, it is possible to cope with data rate change while the number of rotations of rotary drum and recording/reproducing frequency are maintained to be fixed. For this reason, any problem of the mechanical system/electrical system is difficult to occur. Moreover, the drawback of decrease in tape capacity proportional to recording/reproducing speed can be avoided. Further, since the tape recording speed can be varied, recording/reproducing operation of the maximum speed can be conducted in such a manner that it is not above rate of input/output signal of drive. In addition, re-positioning, etc. becomes unnecessary. Thus, bad influence such as loss time or tape damage, etc. can be prevented.

Further, a recording/reproducing apparatus according to this invention comprises an input interface supplied with input data from the external of the apparatus, input buffer means for temporarily storing input data inputted through the input interface, signal processing means for converting data read out from the input buffer means into recording data in which address signals are added every predetermined length, a rotary head provided with a recording head for recording recording data from the signal processing means onto a recording tape and a reproducing head for reproducing recording data on the recording tape, data rate detecting means for detecting a data rate of the input data, recording tape running drive means for carrying out running control of the recording tape, thinning control means for carrying out thinning control of recording operation by the recording head of the rotary head, reproducing means for allowing the reproducing head of the rotary head to scan at a scanning density higher than that at the time of recording on the recording tape to allow an output of the reproducing head to be continuous by using the address signal, and control means such that when data rate of the input data is less than a predetermined value in dependency upon an output from the data rate detecting means, the control means controls the recording tape running drive means to decrease tape running speed, and controls the thinning control means to conduct a control such that recording operation by the recording head of the rotary head is thinned.

By employing such a configuration, even if tape speed changes, effective recording/reproduction can be carried out. Moreover, even if tracking servo at the time of reproduction is not carried out with high accuracy, all data can be reproduced.

Further, reproducing apparatus according to this invention comprises reproducing means for reproducing a signal recorded on a recording tape by using a rotary head, reproduction signal processing means for processing a reproduction signal from the reproducing means so that reproduction data is provided, tape running drive means for carrying out running control of the recording tape of the reproducing means, rate comparing means for comparing data reproduction rate at the reproducing means and data rate of data outputted from the reproduction signal processing means, and speed adjustable control means for adjustably controlling running speed of the recording tape by the tape running drive means in dependency upon a comparison output from the rate comparing means.

Thus, even in the case where data reproduction rate at the reproducing system is higher than output rate from the output buffer, reproduction corresponding to output rate can be carried out without conducting re-positioning operation, etc. in the state where loss time or tape damage does not take place.

BRIEF DESCRIPTION OF THE DRAWINGS

FIGS. 9a, 9b, 9c, 9d, 9e, 9f, 9g, 9h, 9i, 9j, 9k, 9l and 9m are diagrams to which reference will be made in explaining the operation at the time of double density scanning reproduction in which reproducing head scans on recording tape at double scanning density.

BEST MODE FOR CARRYING OUT THE INVENTION

Preferred embodiments of a recording apparatus and a reproducing apparatus according to this invention will now be described with reference to the attached drawings.

Figure 1:
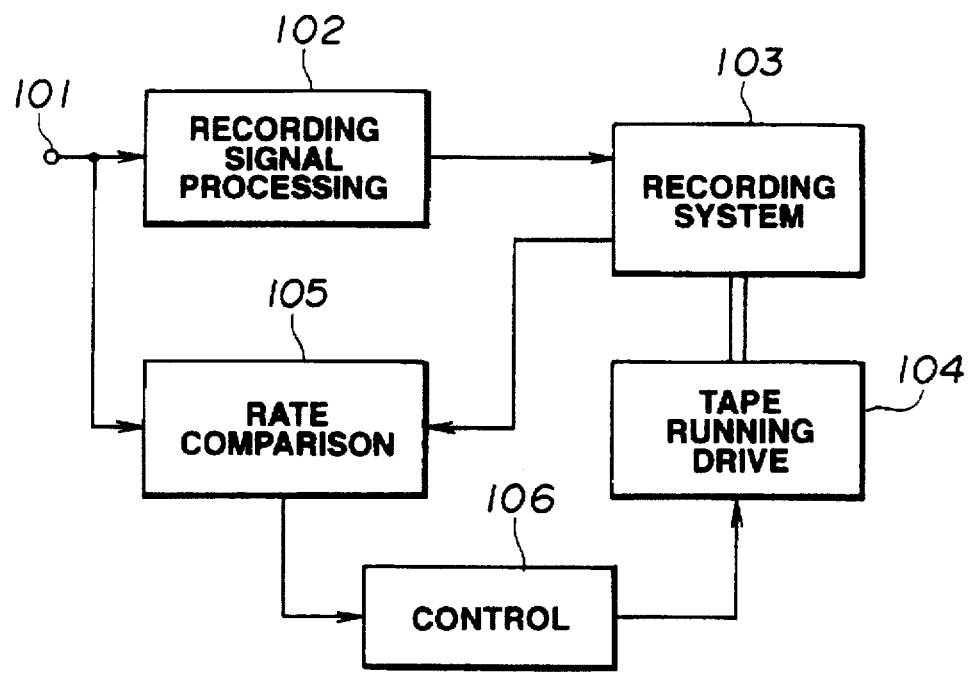
FIG. 1 is a circuit diagram showing, in a block form, the fundamental configuration of an embodiment of a recording apparatus according to this invention.

FIG. 1 is a circuit diagram showing, in a block form, the fundamental configuration of an embodiment of the recording apparatus according to this invention.

In FIG. 1, digital data delivered under control of external device (not shown) is sent to recording signal processing section 102 through input terminal 101. This recording signal processing section 102 serves to carry out signal processing of input data so that a recording signal is provided, and is composed of buffer memory, encoder, error correction encoding circuit, modulator, and the like. Recording signal from the recording signal processing section 102 is sent to recording system 103. Thus, recording is carried out onto recording tape by using rotary head. Tape running drive section 104 carries out tape running control of the recording system 103. Rate comparing section 105 compares data rate of input data from input terminal 101 and data recording rate of recording system 103. Control section 106 adjustably controls running speed of the recording tape by tape running drive section 104 in dependency upon comparison output from the rate comparing section 105.

In accordance with such a configuration, data rate of input data and data recording rate to recording tape by rotary recording head are compared with each other by rate comparing section 105. By this comparison output, running speed of recording tape is controlled. Since it is possible to cope with data rate change while the number of rotations of rotary drum and recording/reproducing frequency are maintained to be fixed, problem of the mechanical system/electric system is difficult to occur. Moreover, the drawback of decrease in tape capacity proportional to recording/ reproducing speed can be avoided. Further, since tape recording speed can be changed, recording/reproduction of the maximum speed can be made in such a manner that it is not above rate of input/output signal of drive. In addition, re-positioning, etc. becomes unnecessary. Thus, bad influence such as loss time or tape damage, etc. can be prevented.

Figure 2:
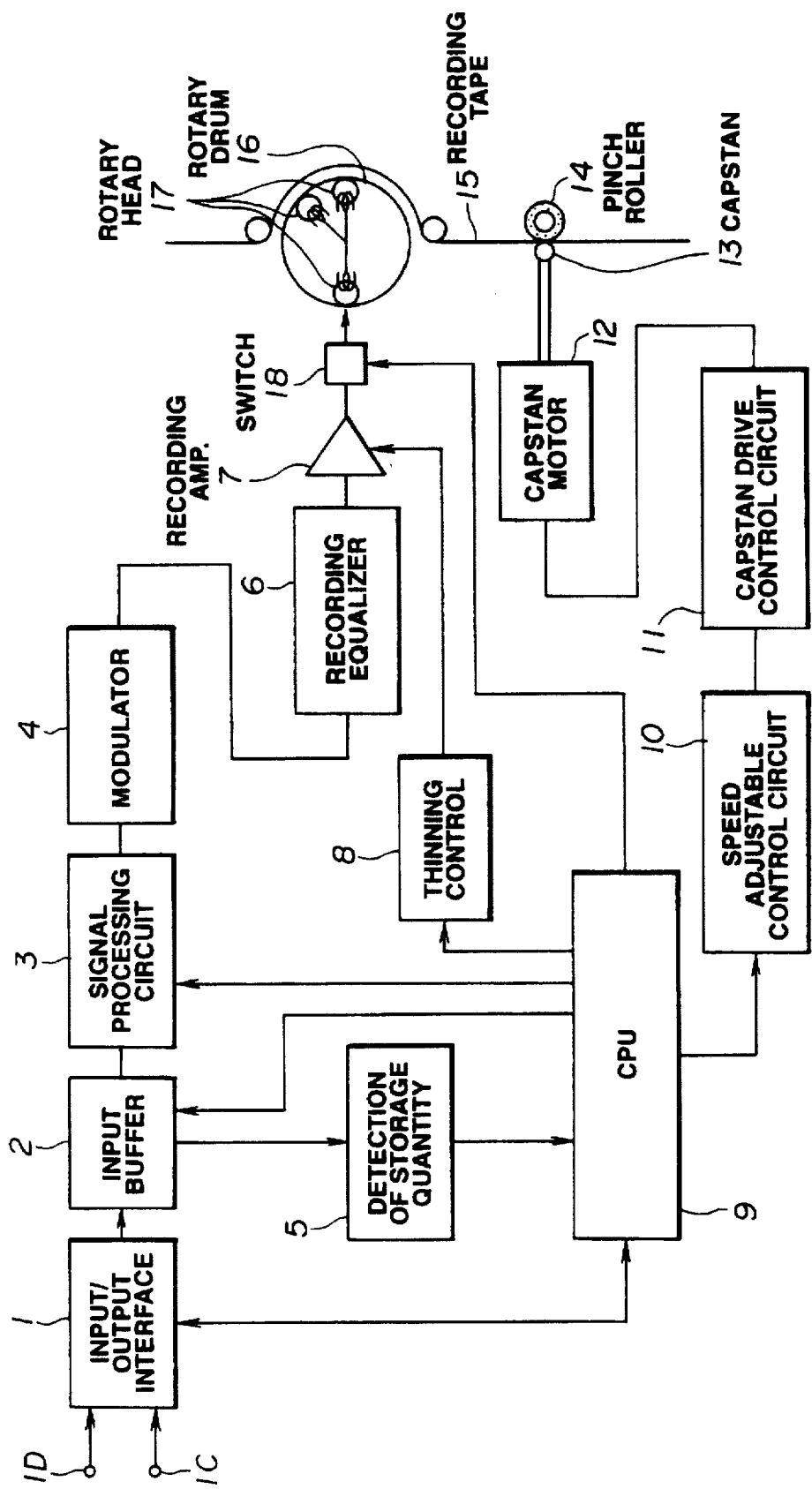
FIG. 2 is a circuit diagram showing, in a block form, an example of the configuration in a more practical sense of the embodiment of the recording apparatus according to this invention.

FIG. 2 is a circuit diagram showing, in a block form, the configuration in more practical sense of the embodiment of such recording apparatus.

In FIG. 2, input/output interface circuit 1 is connected to external device, e.g., host computer, etc. (not shown) through data input terminal 1D and control signal input/ output terminal 1C. The data input terminal 1D is supplied with digital data such as video data, etc. outputted under control of external device at a data rate based on a predetermined data transmission standard, etc. Between external device such as host computer, etc. and input/output interface circuit 1, various control signals are transmitted and received through control signal input/output terminal 1C. As input/ output interface circuit 1, e.g., interface circuit based on so called SCSI (Small Computer System Interface) standard, etc. may be used. Digital data inputted through input/output interface circuit 1 is sent to input buffer circuit 2, and is stored into the internal buffer memory. Moreover, various control signals are transmitted and received between input/output interface circuit 1 and CPU9.

Digital data read out from input buffer circuit 2 is sent to signal processing circuit 3, at which a predetermined signal processing is implemented thereto. The digital data thus processed is sent to modulator 4. Storage quantity of data stored in the internal buffer memory of input buffer circuit 2 is detected by storage quantity detecting circuit 5. The storage quantity thus detected is sent to CPU9. The CPU9 carries out speed control in accordance with the detected storage quantity such that in the case where storage quantity is below a predetermined lower limit determined in advance, the CPU9 switches tape running speed to lower speed side, and in the case where that storage quantity is above a predetermined upper limit when tape running speed is low, the CPU allows tape running speed to be in correspondence with original running speed for a second time. In actual terms, control signal from CPU9 is sent to speed adjustable control circuit 10, and this speed adjustable control circuit 10 drives and controls capstan motor 12 through capstan drive control circuit 11.

Signal processing circuit 3 implements, e.g., interleaving processing to the sent digital data to add code for error correction thereto to further add so called ID information and synchronizing signal thereto to deliver it to modulator 4. As the ID information, track No., data kind identification (discrimination) information and other additional information, etc. can be enumerated. As such additional information, e.g., information indicating that recording speed is switched from the next track may be included. Addition of the ID information is carried out in accordance with, e.g., control from CPU9.

Modulator 4 converts the sent signal into a signal of a modulation system suitable for recording onto magnetic tape. Recording equalizer 6 implements, to that signal, processing for conversion into a signal of frequency characteristic corresponding to frequency characteristic of tape like, e.g., high frequency band emphasis to sent it to recording amplifier 7. Output signal from the recording amplifier 7 is sent to rotary head recording system through switch 18.

In the rotary head recording system, magnetic tape 15 caused to undergo running drive by capstan 13 and pinch roller 14 is wound on the periphery of rotary drum 16, and is caused to undergo guide-running. Signal from the recording amplifier 7 is recorded so as to form oblique recording tracks onto magnetic tape 15 by rotary head 17 provided at rotary drum 16.

At storage quantity detecting circuit 5 and CPU9, input data rate to input buffer circuit 2 and recording rate to magnetic tape 15 which is output data rate are substantially compared with each other. Control signal based on the comparison result is sent to input/output interface circuit 1, and speed adjustable control circuit 10, etc. Output signal from speed adjustable control circuit 10 is sent to capstan motor 12 through capstan drive control circuit 11 to thereby adjustably control tape running speed of the rotary head recording system. Moreover, control signal based on the data rate comparison result is sent to external device, e.g., host machine, etc. through input/output interface circuit 1 to thereby adjustably control input data rate.

Here, fixed recording data rate prescribed in advance in the rotary head recording system is referred to as stationary (steady state) rate or reference rate, and tape running speed at this time is referred to as stationary speed or reference speed.

For example, when input data rate inputted to the input buffer circuit 2 is the same as the stationary rate or is above the stationary rate, data rate comparison result at this time is determined by storage quantity detecting circuit 5 and CPU9. CPU9 sends control signal to input/output interface circuit 1 and speed adjustable control circuit 10 in accordance with the comparison result. Control signal such that tape running speed of the rotary head recording system is caused to be the stationary speed is sent from CPU9 to speed adjustable control circuit 10. Thus, capstan drive control circuit 11 sends drive signal for carrying out running drive of tape at the stationary speed to capstan motor 12. In the case where the input data rate is greater than the stationary rate, CPU9 sends wait request signal, etc. to external device such as host machine, etc. through input/output interface circuit 1 to thereby allow the external device to await data output therefrom to thereby control input data rate from input/output interface circuit 1 to input buffer circuit 2 so that it is equal to the stationary rate.

Figure 3:
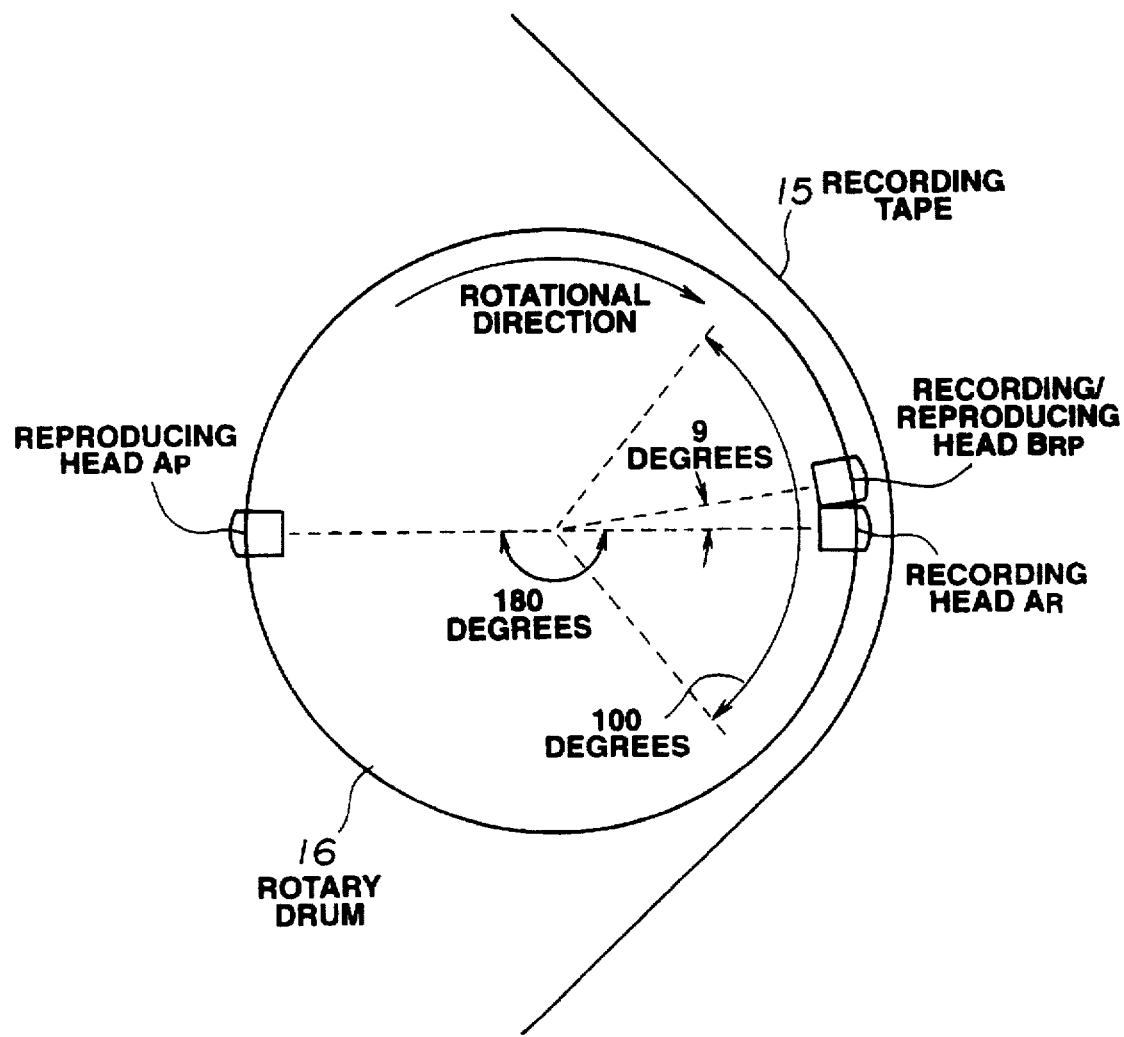
FIG. 3 is a view showing the relationship between magnetic head of recording tape and rotary drum.

Rotary head 17 of the above-mentioned rotary head recording system includes, as shown in FIG. 3, for example, recording head $A_R$ and reproducing head $A_p$ attached oppositely to each other with an angular difference of about 180 degrees therebetween, and recording/reproducing head $B_{RP}$ attached in the state shifted by 9 degrees from the recording head $A_R$, and recording tape 15 is wound on rotary drum 16 rotating in a direction indicated by arrow R at a winding angle of about 100 degrees. In this example, recording head $A_R$ and reproducing head $A_p$ both have plus (+) azimuth, and recording/reproducing head $B_{RP}$ has minus (−) azimuth. These plus (+) and minus (−) azimuth (angles) are such that signal recorded by head of one azimuth can be reproduced by head of the same azimuth, but when head of the other azimuth is used, reproduction level is lowered to such a degree that effective reproduction cannot be carried out.

The operation at the time of recording data will now be described with reference to FIG. 4.

Figure 4:
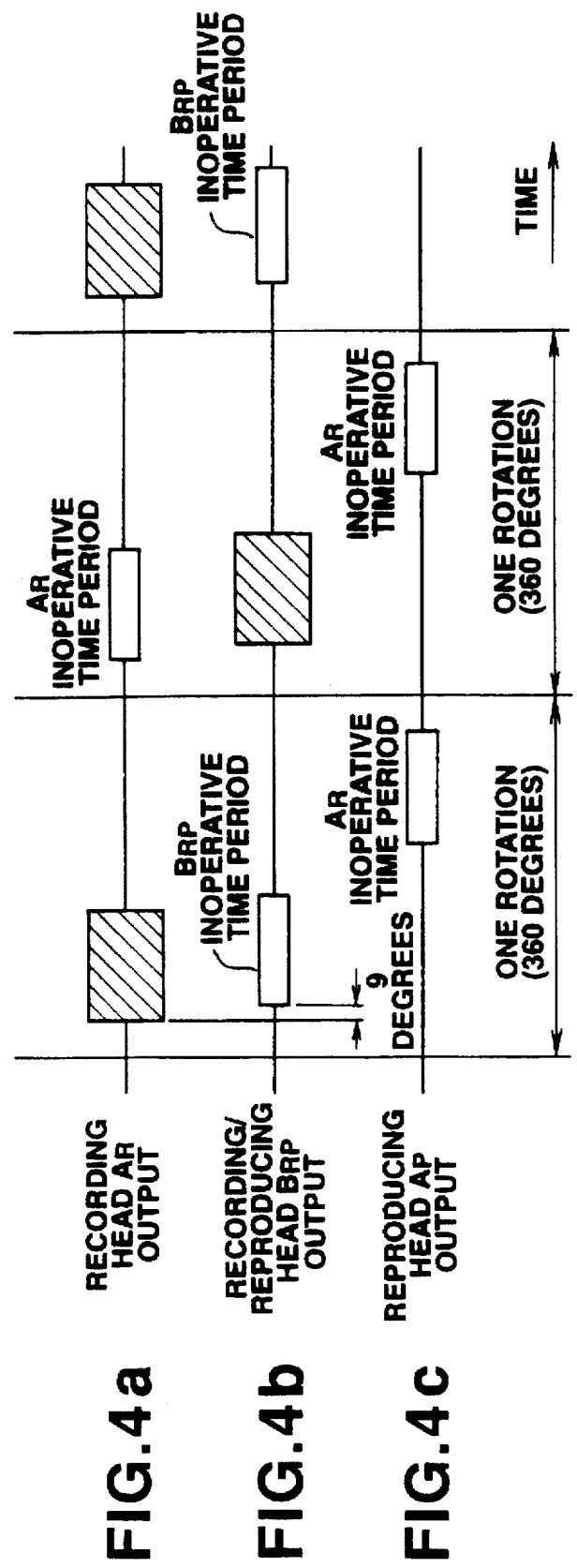
FIGS. 4a, 4b and 4c are diagrams to which reference will be made in explaining a recording operation.
Figure 5:
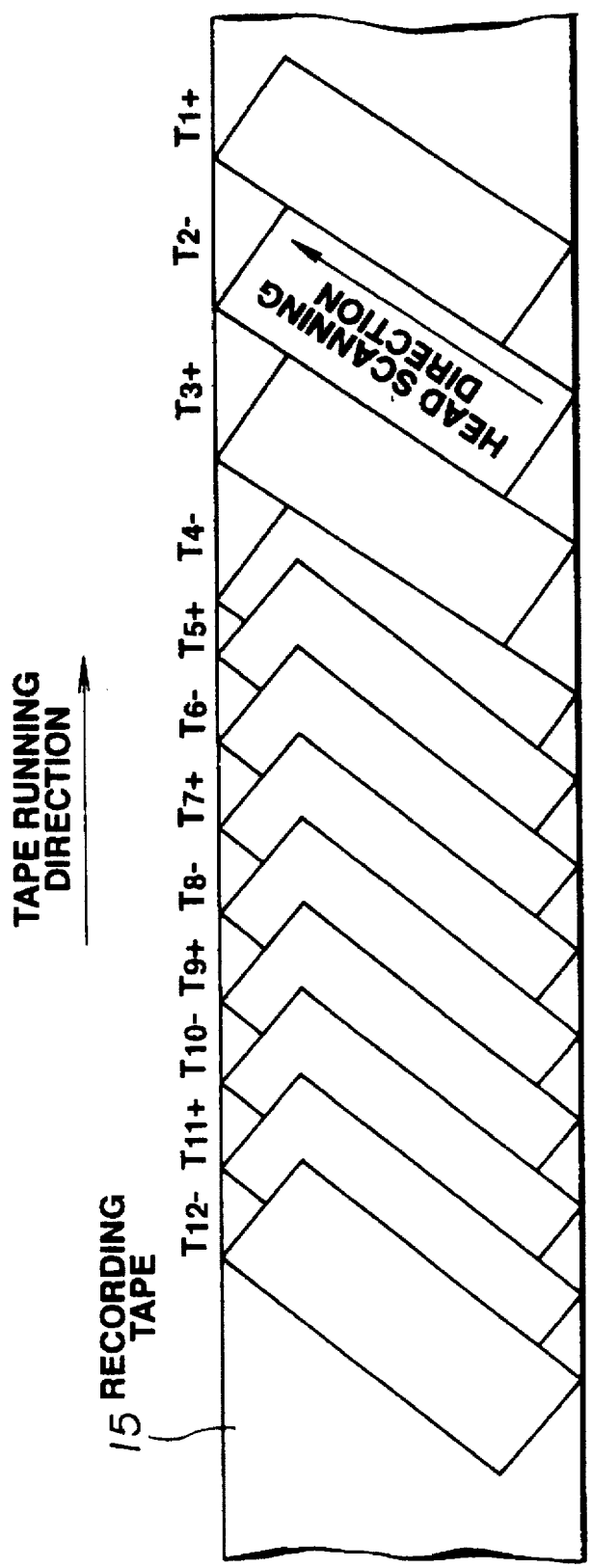
FIG. 5 is a view showing a recording track pattern on recording tape in the case where no thinning is carried out when tape running speed is switched from stationary speed to speed of one half thereof.

In accordance with rotation of the rotary drum 16, the recording head $A_R$ carries out recording onto the recording tape 15 only for time periods indicated by slanting line portions of a of FIG. 4, and the recording/reproducing head $B_{RP}$ carries out recording onto the recording tape 15 only for a time period indicated by b of FIG. 4. Namely, during the time period of the first rotation of 360 degrees of two rotations of the rotary drum 16, the recording head $A_R$ scans on the recording tape 15 to carry out recording operation only for time period of slanting line portion of a of FIG. 4 corresponding to 100 degrees of the tape winding angle, whereby oblique recording track $T_{1+}$ on recording tape 15 shown in FIG. 5, for example, is recorded and formed. At the time period of the next one rotation, the recording/reproducing head $B_{RP}$ carries out recording operation only for time period indicated by slanting lines of b of FIG. 4, whereby recording track $T_{2-}$ of FIG. 5 is recorded and formed. In a manner as described above, the recording head $A_R$ and the recording/reproducing head $B_{RP}$ alternately carry out recording operations, whereby data are recorded so as to form recording tracks $T_{1+}$, $T_{2-}$, $T_{3+}$, $T_{4-}$, .... in order recited on the recording tape of FIG. 5.

In the FIG. 2 mentioned above, when rate of data inputted to input buffer circuit 2 is in a range from one half of the stationary rate to the stationary rate, data rate comparison result by storage quantity detecting circuit 5 and CPU9 is sent to speed adjustable control circuit 10. On the basis of this comparison result, control signal for carrying out deceleration control such that running speed of recording tape 15 becomes equal to speed one half of the stationary speed is sent from speed adjustable control circuit 10 to capstan drive control circuit 11. Thus, capstan drive control circuit 11 drives and controls capstan motor 12 at the speed one half of the stationary speed to rotationally drive capstan 13. As a result, running speed of recording tape 15 is controlled so that it becomes equal to one half of the stationary speed.

When a control is conducted such that tape running speed of the recording system becomes equal to one half of the stationary speed in a manner stated above, it is sufficient to send wait control signal to external device such as host machine, etc. through input/output interface circuit 1 from CPU9 so that input rate to the input buffer circuit 2 becomes equal to one half of the stationary rate on the average.

When a deceleration control is conducted such that running speed is lower than the stationary speed, it is preferable to carry out thinning control of recording operation by thinning control circuit 8. Namely, at the time of deceleration control, CPU9 sends thinning control signal to thinning control circuit 8. Thus, thinning control circuit 8 carries out ON/OFF control of recording amplifier 7 to thereby conduct thinning control of recording operation. Moreover, CPU9 conducts switching control of switch 18 for carrying out switching between respective heads of the rotary drum 16.

The reason why such a control is carried out is to allow for the fact that when, e.g., tape running speed is controlled so that it becomes equal to one half of the stationary speed, if thinning control as mentioned above is not carried out, tracks (data) might be overwritten in a manner of tracks $T_{5+}$, $T_{6-}$, $T_{7+}$, $T_{8-}$, ... of FIG. 5. Namely, deceleration control of data rate is carried out so that data recording operation corresponding to one rotation is interrupted for a time period during which rotary drum 16 makes two rotations.

It should be noted that, in the embodiment in more practical sense, in consideration of the fact that transient phenomenon might take place until rotation number of capstan motor 12 becomes equal to one half of rotation number at the time of stationary speed and running speed of recording tape 15 actually becomes equal to one half of the stationary speed, recording is interrupted for a time period of two rotations of drum only when speed changes. Namely, in the transient state where tape speed becomes equal to ½, there is no possibility that track pitch of pattern on recording tape 15 might be narrowed, but fluctuation would take place in tape running. In order to interrupt recording until such fluctuation becomes stable, thinning control is conducted for a time period corresponding to 2 tracks only when tape speed changes, and thinning control is conducted at a rate of one track per two tracks at times subsequent thereto.

Figure 6:
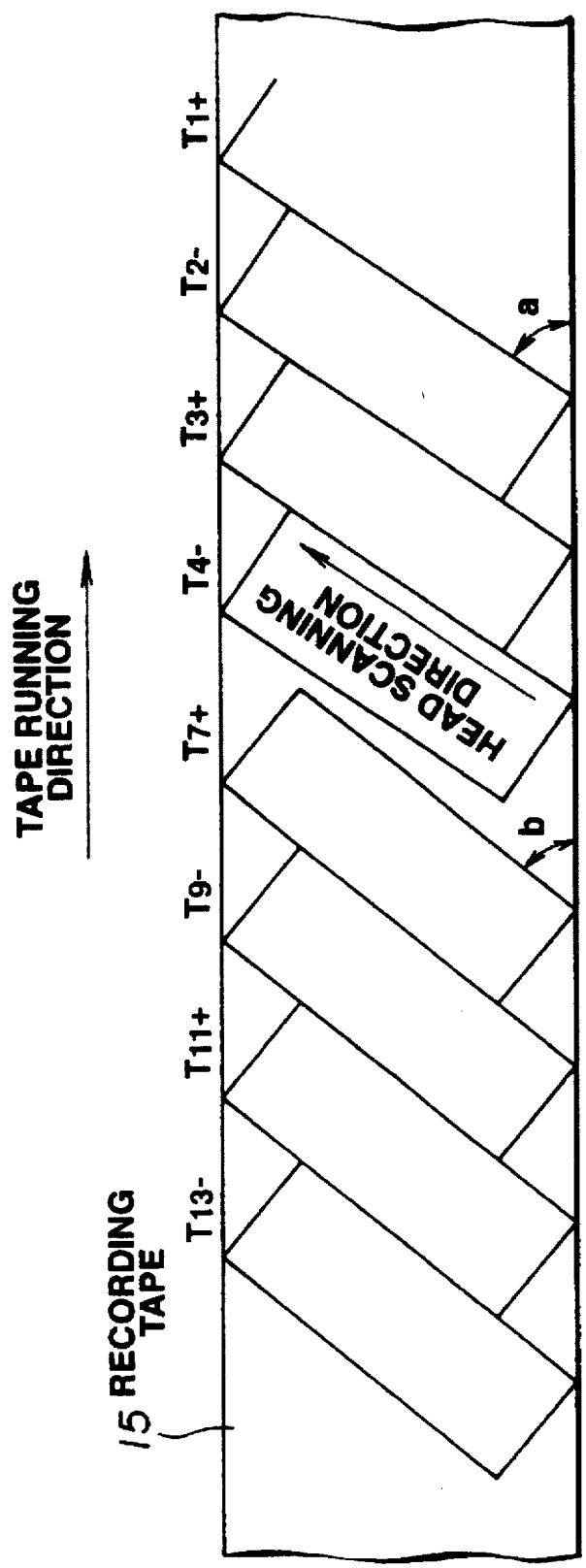
FIG. 6 is a view showing recording track pattern on recording tape in the case where thinning is carried out when tape running speed is switched from stationary speed to speed of one half thereof.

An example of track pattern on recording tape 15 when such a thinning control is carried out is shown in FIG. 6.

In FIG. 6, after data is recorded up to track $T_{4-}$, switching control is conducted such that tape running speed becomes equal to one half of the stationary speed. As a result, data corresponding to 2 tracks, i.e., data corresponding to tracks $T_{5+}$, $T_{6-}$ of the FIG. 5 mentioned above are thinned, and the next track $T_{7+}$, is recorded. At times subsequent thereto, recording is continued at a rate such that one track is thinned per two tracks. At this time, recording head $A_R$ and the recording/reproducing head $B_{RP}$ of the rotary head 17 are caused to alternately undergo switching control in such a manner that plus (+) azimuth and minus (−) azimuth alternately appear with respect to azimuth angle of recording track. Thus, tracks $T_{7+}$, $T_{9-}$, $T_{11+}$, $T_{13-}$, ... are successively recorded and formed.

When rate of data inputted to input buffer 2 of FIG. 2 is in a range from one half of the stationary rate to the stationary rate, recording amplifier 7 is caused to undergo ON/OFF control by the thinning control circuit 8 to carry out thinning of one track per two tracks, thereby making it possible to record recording data which has been caused to undergo a deceleration control such that rate becomes equal to one half.

In recording the recording track $T_{4-}$, the fact that recording speed is switched into one half from the next track is written into the ID information to read out it in reproduction to allow tape running speed to undergo switching control.

It should be noted that, in FIG. 6, with respect to recording tracks $T_{1+}$–$T_{4-}$ recorded when tape running speed is the stationary speed and recording tracks $T_{7+}$–recorded at a lower tape running speed after undergone the thinning control, recording angles a, b are slightly different and recording wave length slightly changes, but no problem occurs at the time of reproduction of data.

When rate of data inputted to input buffer circuit 2 of the FIG. 2 mentioned above is in a range from the stationary rate to one half thereof, recording rate recorded from the rotary head 17 onto the recording tape 15 is switched to ¼ of the stationary speed. At the of speed of ¼ times, it is sufficient to conduct a control in such a manner that three tracks are thinned per four tracks. However, since fluctuation takes place in tape running immediately after running speed of the recording tape 15 is switched as the above-described transient phenomenon, it is preferable for allowing such fluctuation to be stable to interrupt recording operation of track for a time period corresponding four rotations or more. After tape running becomes stable, such a thinning control to record data only for a time period corresponding to one rotation per four rotations of the rotary drum 16, thereby making possible to record data without carrying out overwriting.

Namely, in the case where rate of data inputted to the input buffer circuit 2 is lower than the stationary rate, CPU9 of FIG. 2 controls thinning control circuit 8 and switch 18 as follows. Namely, tape running speed is caused to undergo switching control so as take a value indicated by ratio of one to integer, so recording rate is switched into a value indicated by ratio of one to integer to only once carry out recording operation for a time period during which the rotary drum 16 rotates the number of integer times. Moreover, thinning control circuit 8 carries out ON/OFF control of recording amplifier. Thus, data recording rate to recording tape 15 by rotary head 17 is controlled.

Thereafter, in the case where input data rate delivered to input buffer circuit 2 is caused to be in correspondence with the stationary speed for a second time, increase in data storage quantity of buffer memory within input buffer circuit 2 is detected by storage quantity detecting circuit 5. Detection signal indicating that increase is sent to CPU9. Thus, CPU9 carries out control in a direction to increase tape running speed. In actual terms, CPU9 sends, to speed adjustable control circuit 10, such a control signal to switch tape running speed into the stationary speed. Responding to this, speed adjustable control circuit 10 drives, at the stationary speed, capstan motor 12 through capstan drive control circuit 11. Accordingly, rotation of capstan 13 is controlled, and running speed of recording tape 15 is also switched into the stationary speed.

Also at the time of switching into the stationary speed, fluctuation takes place in running of recording tape 15 as transient phenomenon. For this reason, for a time period until such fluctuation of this tape running becomes stable, e.g., for a time period during which, e.g., the rotary drum 16 makes two rotations, recording operations of recording head $A_R$ and recording/reproducing head $B_{RP}$ are interrupted. For a time period during which the recording operation is in interrupted state, running speed of the recording tape 15 is caused to be in correspondence with the stationary speed for a second time. Thereafter, ordinary recording operation is thus carried out.

As described above, in accordance with the recording apparatus according to this invention, since running speed control of recording tape is carried out in correspondence with change of data rate, the recording apparatus can cope with data rate change while the number of rotations of rotary drum and recording/reproducing frequency are maintained to be fixed. For this reason, problems of mechanical system/ electrical system are difficult to occur. Moreover, the drawback that tape capacity is decreased in proportion to recording/reproducing speed can be avoided. Further, since tape running speed can be changed, recording/reproduction of the maximum speed can be made in the state where it is not above rate of input/output signal of drive. In addition, re-positioning, etc. becomes unnecessary. Thus, bad influence such as loss time or tape damage, etc. can be prevented.

Outline of the configuration of an embodiment of a reproducing apparatus according to this invention will now be described with reference to FIG. 7

Figure 7:
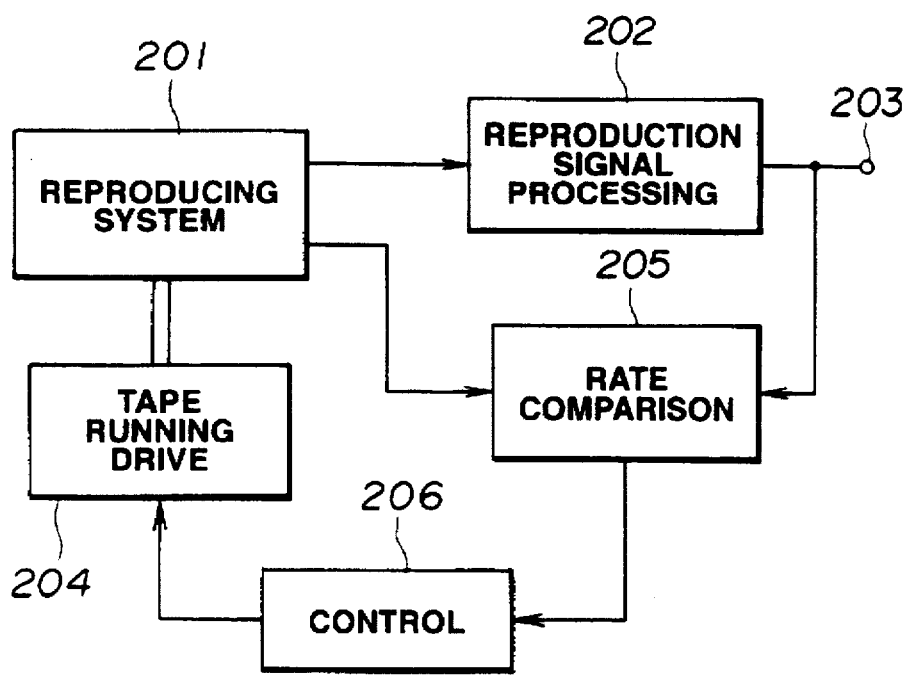
FIG. 7 is a circuit diagram showing, in a block form, the fundamental configuration of an embodiment of a reproducing apparatus according to this invention.

In FIG. 7, reproduction signal from reproducing system 201 for carrying out reproduction of recording tape by using rotary head is sent to reproduction signal processing section 202. This reproduction signal processing section 202 is composed of clock extracting circuit, demodulator, decoder including error correction decoding, and buffer memory, etc. for processing reproduction signal, and reproduced data is taken out through output terminal 203. Tape running drive section 204 carries out tape running control of reproducing system 201. Rate comparing section 205 compares data reproduction rate from reproducing system 201 and output data rate sent from reproduction signal processing section 202 to output terminal 203. In accordance with the comparison output, control section 206 adjustably controls tape running speed by tape running drive section 204.

Figure 8:
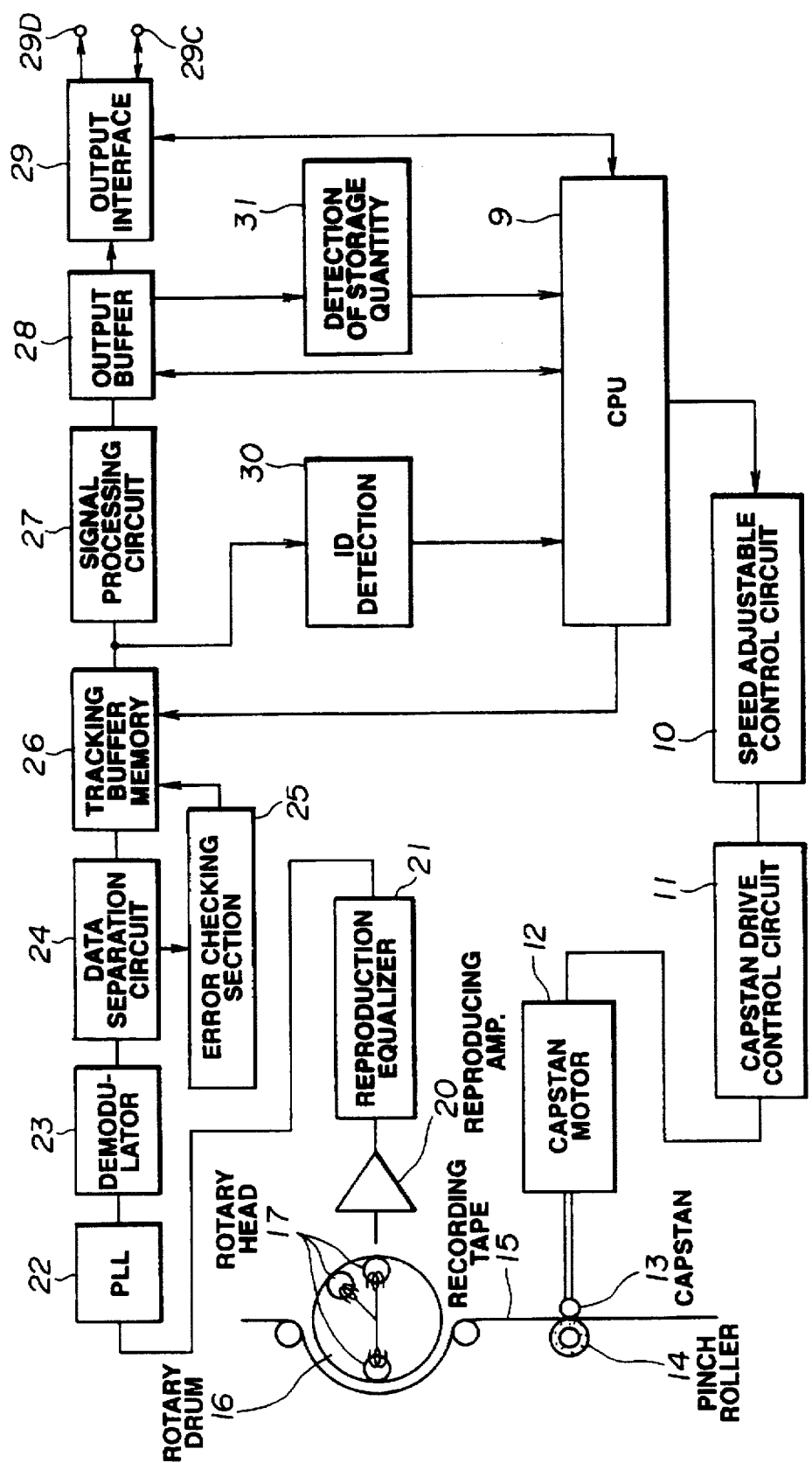
FIG. 8 is a circuit diagram showing, in a block form, the configuration in a more practical sense of the embodiment of the reproducing apparatus according to this invention.

FIG. 8 is a circuit diagram showing, in a block form, an example of the configuration in a more practical sense of the above-described embodiment of the reproducing apparatus.

In the reproducing system 201 shown in FIG. 8, similarly to the recording system of the rotary head of FIG. 2, magnetic tape 15 caused to undergo running drive by capstan 13 and pinch roller 14 is caused to undergo guide-running in the state wound on the periphery of rotary drum 16. By scanning oblique recording tracks recorded on magnetic tape 15 by using rotary head 17 provided at rotary drum 16, reproduction of recording signal is carried out.

In the case of carrying out reproduction at data rate of stationary rate or reference rate at the time of recording, recording tape 15 is caused to undergo running drive at the stationary speed or the reference speed. Thus, recording signal on recording tape 15 is read out by rotary head 17 and is then sent to reproduction equalizer 21 through reproducing amplifier 20. Reproduction signal sent to the reproducing equalizer 21 is caused to undergo waveform equalizing, and is sent to PLL circuit 22 for extraction of clock. Clock component in reproduction signal is extracted by this PLL circuit 22 and is synchronized. Thereafter, that signal is demodulated into, e.g., NRZ (Non Return to Zero) signal by demodulator 23.

NRZ signal demodulated by demodulator 23 is sent to data separating circuit 24 and error checking section 26. The data separating circuit 24 separates data and address data from the demodulated NRZ signal. The error checking section 25 judges whether or not there is any error in reproduction data. If there is no error, the error checking section 25 allows tracking buffer memory 28 to store thereinto, the separated data in accordance with the address separated at data separating circuit 24.

Tracking buffer memory 28 is under control of CPU9, and written data is read out by clock of reference timing. The data thus read out is then sent to signal processing circuit 27. At this signal processing circuit 27, e.g., deinterleaving processing, error correction processing and/or interpolation processing, etc. are implemented to data from tracking buffer memory 26. The data thus processed is stored into buffer memory of output buffer circuit 28, and is then taken out from output terminal 29D through output interface circuit 29. The data thus taken out is sent to external device (not shown), etc.

In this embodiment, as reproducing operation of recording tape 15, there is employed technology for rotationally driving rotary head 17, e.g., at a speed twice higher than that at the time of recording to read recording signal. This technology is already proposed by the applicant of this invention in the Japanese Patent Application Laid Open No. 150109/1982, and is also disclosed in "Nikkei Electronics" published by Nikkei BP company, Mar. 30, 1992, pp 147–155.

This reproducing technology by double density scan will now be described with reference to FIGS. 9a–m by drawing attention only to reproduction signal from the reproducing head $A_p$ of FIG. 3. In FIG. 9m, recording tracks A1, A2, A3, . . . on recording tape 15 indicate tracks recorded by recording head $A_R$ of FIG. 3, and recording tracks B1, B2, B3, . . . indicate tracks recorded by the recording/ reproducing head $B_{RP}$ of FIG. 3. These heads $A_R$, $B_{RP}$ have azimuth angles different from each other, and reproduction can be made only by reproducing head of the same azimuth angle. Moreover, centers of tracking loci on magnetic tape 15 by the reproducing head Ap of FIG. 3 are designated at $T_1$, $T_2$, $T_3$, $T_4$, . . .

When attention is drawn only to reproduction signal from the reproducing head $A_p$, head is passed through recording tracks A2, B1, A1 in succession in order recited at the time of head scanning of tracking locus $T_1$. Since azimuth angle is opposite to the above at recording track B1, it is unable to read recording signal. At this time, envelope of reproduction RF signal from the reproducing head $A_p$ is as indicated by signal $S_{RF1}$ of FIG. 9a. When this reproduction RF signal $S_{RF1}$ is demodulated so that data signal is provided for a second time, there results signal $S_{D1}$ as shown in FIG. 9e. This signal $S_{d1}$ is written into tracking buffer memory 26 of FIG. 8. In this case, data written into the area of memory address $A_{A2}$ serving as the memory area corresponding to the recording track A2 within the tracking buffer memory 26 is as indicated by $D_{M1}$ of FIG. 9i. When such data write operation is repeated with respect to tracking loci $T_2$, $T_3$, $T_4$ of FIG. 9, RF signals $S_{RF2}$, $S_{RF3}$, $S_{RF4}$ as shown in FIGS. 9b, 9c and 9d are respectively obtained. By allowing these RF signals to undergo data demodulation, there respectively result data signal $S_{D2}$, $S_{D3}$, $S_{D4}$ as shown in FIGS. 9f, 9g and 9h. Thus, data written into the memory area of memory address $S_{A2}$ corresponding to recording track A2 within the tracking buffer memory 26 are as indicated by $D_{M2}$, $D_{M3}$, $D_{M4}$ of FIG. 9.

FIGS. 9j, 9k and 9l. It is to be noted that numerals 1~24 indicated within the belt-shaped portions of $S_{D1}$~$S_{D4}$.

$D_{M1}$–$D_{M4}$ of FIGS. 9e–9l indicate block No. or block address within one track of recording data, and while one track consists of 24 blocks for brevity in FIG. 9, it is of course that the number of blocks is not limited to such implementation.

Data recorded on recording track A2 in this way are all reproduced while overlapping every scanning of the above-mentioned reproducing head $A_p$. In this case, because data are reproduced in a manner to transverse tracks, even if reproduced data are not in order recorded, writing of data may be conducted at random on the memory space so that data are in correct order.

Namely, track address or block address recorded along with data on the tape is read out. If there is no error, corresponding data is written into the memory in accordance with the address. In the case of memory input, even if order is different, data will be written in correct order into the memory in accordance with address. When a certain time is passed, all data are correctly written into the memory. Then, data are read out in correct order in accordance with reference address from the CPU9.

Figures 10A, 10B, 10C:
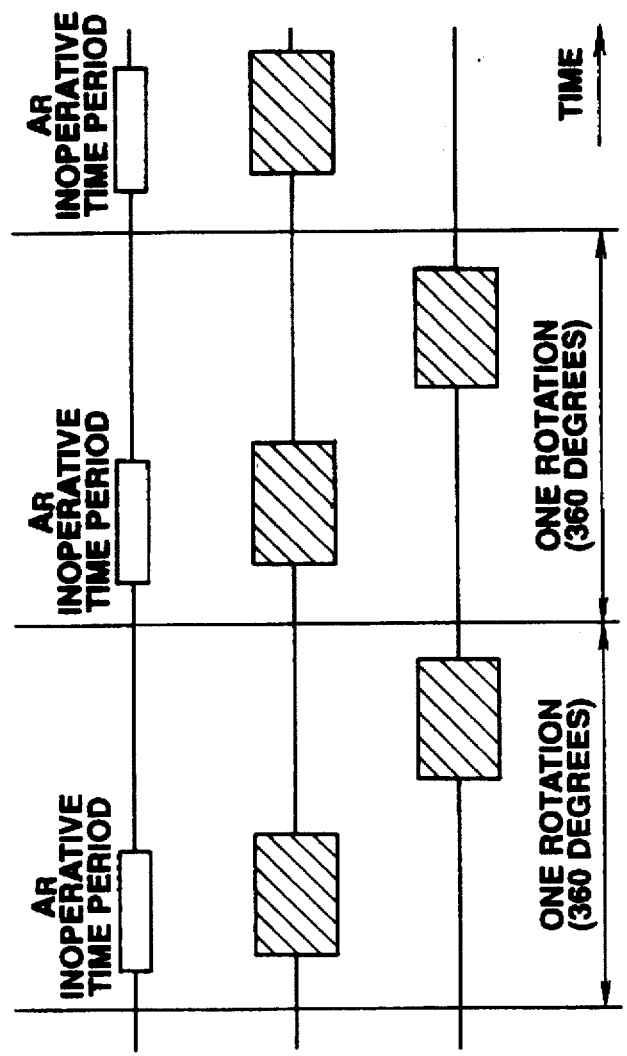
FIGS. 10a, 10b and 10c are diagrams to which reference will be made in explaining a reproducing operation.

It should be noted that while double density scan at the time of reproduction is generally realized by allowing rotation number of the rotary drum to be twice greater than that at the time of recording, in the case of an actual example such that rotary head shown in the FIG. 3 mentioned above is used to alternately operate A head and B head every rotation as shown in FIG. 4 to carry out recording, reproduction may be carried by A head and B head during one rotation at the time of reproduction as shown in FIG. 10 to rotate the drum at the same rotational speed as that at the time of recording.

Namely, in FIG. 10, the same rotary head as that of the FIG. 3 mentioned above is used. Recording head $A_R$ within rotary drum 16 is inoperative at all times as indicated by a of FIG. 10. Recording/reproducing head $B_{RP}$ and reproducing head AP alternately carry out reproducing operations for a time period during which the rotary drum 16 makes one rotation as respectively indicated by slanting line portions of b and c of FIG. 10, whereby head scanning of speed twice greater than that at the time of recording is carried out at the same drum rotational speed as that at the time of recording.

Data which has been reproduced by using double density scan technology as described above, has been written into tracking buffer memory 26, and has been read out from tracking buffer memory 26 in correct order as described above is sent to signal processing circuit 27, and is also sent to ID detecting circuit 30. At the ID detecting circuit 30, the above-mentioned ID information written at a predetermined position within the track is detected. In the ID information, speed switching information indicating that tape running speed is switched into ½, e.g., from the next track at the time of recording is included. Such ID information is sent to CPU9.

Data after undergone signal processing such as the error correction mentioned above, etc. from signal processing circuit 27 is sent to output buffer circuit 28. Storage quantity detecting circuit 31 detects quantity of data stored in buffer memory in the output buffer circuit 28 to sent the detected data storage quantity to CPU9. Noteover, CPU9 carries out transmission and reception of control signal between CPU9 and external equipment such as host computer, etc. through output interface circuit 29 and through control signal input/output terminal 29C.

CPU9 substantially compares data input rate to output buffer circuit 28, i.e., data reproduction rate at the reproducing system and data output rate which is rate of data outputted through output interface circuit 29 from output buffer circuit 28 to carry out adjustable control of tape running speed corresponding to the comparison result. Namely, speed control information from CPU9 is sent to capstan drive control circuit 11 through speed adjustable control circuit 10 to adjustably control rotational speed of capstan motor 12 to thereby adjustably control running speed of recording tape 15.

It should be noted that if, by the double density scan technology, recording angle of track on recording tape 15 is varied in reproduction at the stationary speed, and recording angle is slightly different from head scan angle, it is of course that any problem does not take place. In addition, even if tape running speed is switched halfway as shown in FIG. 6, so gap (clearance) or short no recording portion exists, because the speed switching information is written into the ID information in recording track $T_{4-}$, ID detecting circuit 30 detects this to transfer it to CPU9. For this reason, any problem does not take place.

In the case where output data rate outputted through output interface circuit 29 from output buffer circuit 28 is below data reproduction rate at the reproducing system and it is desired to reduce reproduction speed, control operation as described below is carried out on the basis of control signal from CPU9.

Namely, in the case where when double density scan as described above is carried out in the reproducing system, control signal for allowing reproduction rate to be, e.g., ½ is outputted from CPU9, rotational speed of capstan 13 is reduced to ½ on the basis of the control signal at the time point when, e.g., scanning of the recording/reproducing head $B_{RP}$ is completed. Thus, tape running speed also becomes equal to one half. It is here noted that drum rotational speed does not change, and signal reproduction is continued.

In this case, reproducing head carries out quadruple density scan with respect to recording tracks. As a result, it takes place that the same block within track is normally reproduced twice or more, and it frequently takes place that reproduction is judged to be normal twice or more also by error checking. However, since data of the same block is written into the same block address of the tracking buffer memory 26, such data is reconstructed in correct data order in the memory. Accordingly, any problem does not take place.

When it is desired to allow reproducing speed to be in correspondence with the stationary speed for a second time, an approach is employed to carry out, on the basis of control signal for allowing tape speed from CPU9 to be in correspondence with stationary speed for a second time, switching control of rotational speed of capstan 13 at the time point when, e.g., scanning of the recording/reproducing head $B_{RP}$ is completed to thereby allow tape running speed to be in correspondence with the stationary speed for a second time.

At the time of recording, in the case where recording interruption portion or no recording portion like portion between recording tracks $T_{4-}$ and $T_{7+}$ of FIG. 6 exists in order to allow the above-described fluctuation of tape at the time of switching of tape speed to be stable, whether the no recording portion is based on interruption at the time of tape speed switching or any other cause, e.g., error, etc. at the time of recording/reproduction can be judged by detecting speed switching information in the ID information recorded within recording track $T_{4-}$ as described above. For this reason, any problem does not take place.

In this embodiment, tracking buffer memory 26 and buffer memory within output buffer circuit 28 may be shared (in common).

In accordance with this embodiment, even in the case where data reproduction rate at the reproducing system is higher than output rate from output buffer, reproduction corresponding to output rate can be carried out in the state where loss time or tape damage does not take place without carrying out re-positioning operation, etc.

In the above-mentioned embodiments of FIGS. 2 and 8, examples of recording section and reproducing section of the recording/reproducing apparatus are illustrated. Capstan 13, pinch roller 14, rotary drum 16 and rotary head 17 which are respectively the same in the recording system and the reproducing system are used, and CPU9, speed adjustable control circuit 10, capstan drive control circuit 11 and capstan motor 12 are shared (in common). Those components are respectively used as independent parts for recording and reproduction to constitute an apparatus dedicated to recording or an apparatus dedicated to reproduction.

In addition, there may be employed a configuration in which reproducing heads of which number is greater than that of recording heads are provided at the rotary drum, thereby increasing track scanning density at the time of reproduction.

What is claimed is:

1. A recording apparatus comprising:
   an input interface supplied with input data with a data rate from a device external to the apparatus;
   input buffer means for temporarily storing input data inputted through the input interface;
   signal processing means for converting data read out from the input buffer means into recording data;
   a rotary head provided with a recording head for recording the recording data onto a recording tape;
   data rate detecting means for detecting the data rate of the input data;
   recording tape running drive means for carrying out running control of the recording tape;
   thinning control means for thinning-controlling recording operation by the recording head of the rotary head; and
   recording control means for controlling the recording tape running drive means and the thinning control means in accordance with an output from the data rate detecting means,
   the recording control means being operative so that when the data rate of the input data is less than a predetermined value, the recording control means controls the recording tape running drive means to decrease running speed of the recording tape, and controls the thinning control means to perform the thinning-control recording operation by ON/OFF switching the recording data to the recording head of the rotary head.

2. A recording apparatus as set forth in claim 1, wherein the data rate detecting means detects data storage quantity of the input buffer means.

3. A recording/reproducing apparatus comprising:
   an input interface supplied with input data with a data rate from a device external to the apparatus;
   input buffer means for temporarily storing input data inputted through the input interface;
   signal processing means for converting data read out from the input buffer means into recording data in which address signals are added every predetermined length;
   a rotary head provided with a recording head for recording recording data from the signal processing means onto a recording tape and a reproducing head for reproducing recording data on the recording tape;
   data rate detecting means for detecting data rate of the input data;
   recording tape running drive means for carrying out running control of the recording tape;
   thinning control means for thinning-controlling recording operation by the recording head of the rotary head;
   reproducing means for allowing the reproducing head of the rotary head to scan at a scanning speed higher than that at the time of recording on the recording tape to cause an output of the reproducing head to be continuous by using the address signal; and
   recording control means operative so that when data rate of the input data is less than a predetermined value in accordance with an output from the data rate detecting means, the recording control means controls the recording tape running drive means to decrease tape running speed, and controls the thinning control means to carry out thinning of recording operation by ON/OFF switching the recording data to the recording head of the rotary head.

4. A recording/reproducing apparatus as set forth in claim 3, wherein the data rate detecting means detects data storage quantity of the input buffer means to thereby detect the data rate of the input data.

5. A recording/reproducing apparatus as set forth in claim 3,
   wherein the rotary head includes reproducing heads of which number is greater than that of recording heads, and
   wherein the control means is such that during reproducing operation by the reproducing head of the rotary head, the control means controls the recording tape running drive means so as to run the recording tape at the same tape running speed as that at the time of recording.

6. A recording/reproducing apparatus as set forth in claim 3, which further comprises:
   output buffer means for temporarily storing reproduction data reproduced by the reproducing means;
   an output interface for outputting the reproduction data to the external of the apparatus; and
   output data rate detecting means for detecting data rate of the output data,
   wherein the control means is such that when output data rate detected by the output data rate detecting means is below a predetermined value, the control means controls the recording tape running drive means so as to decrease running speed of the recording tape.

7. A recording apparatus comprising:
   an input interface supplied with input data with a data rate from a device external to the apparatus;
   input buffer means for temporarily storing input data inputted through the input interface;
   signal processing means for converting data read out from the input buffer means into recording data;
   a rotary head provided with a recording head for recording the recording data onto a recording tape;
   data rate detecting means for detecting the data rate of the input data;
   recording tape running drive means for carrying out running control of the recording tape;
   thinning control means for thinning-controlling recording operation by the recording head of the rotary head; and
   recording control means for controlling the recording tape running drive means and the thinning control means in accordance with an output from the data rate detecting means, the recording control means being operative so that when the data rate of the input data is less than a predetermined value, the recording control means controls the recording tape running drive means to decrease running speed of the recording tape, and controls the thinning control means so as to carry out thinning of the recording operation by the recording head of the rotary head for a predetermined time.

8. A recording apparatus as set forth in claim 7, wherein the control means is operative so that when running speed of the recording tape changes, the control means delivers, to the signal processing means, speed switching information that running speed of the recording tape has been switched, and wherein the signal processing means forms the recording data from the input data according to the speed switching information.

9. A recording apparatus comprising:

an input interface supplied with input data with a data rate from a device external to the apparatus;

input buffer means for temporarily storing input data inputted through the input interface;

signal processing means for converting data read out from the input buffer means into recording data, said signal processing means having a signal processing circuit for implementing error correction coding processing to data read out from the input buffer means, modulating means for modulating an output signal from the signal processing circuit, and a recording amplifier for amplifying an output signal from the modulating means so as to form the recording data;

a rotary head provided with a recording head for recording the recording data onto a recording tape;

data rate detecting means for detecting the data rate of the input data;

recording tape running drive means for carrying out running control of the recording tape;

thinning control means for carrying out ON/OFF control of the recording amplifier to thereby effect thinning-control recording operation by the recording head of the rotary head; and recording control means for controlling the recording tape running drive means and the thinning control means in accordance with an output from the data rate detecting means, the recording control means being operative so that when the data rate of the input data is less than a predetermined value, the recording control means controls the recording tape running drive means to decrease running speed of the recording tape, and controls the thinning control means for the thinning-control recording operation by the recording head of the rotary head.

10. A recording apparatus comprising:

an input interface supplied with input data with a data rate from a device external to the apparatus;

input buffer means for temporarily storing input data inputted through the input interface;

signal processing means for converting data read out from the input buffer means into recording data;

a rotary head provided with a recording head for recording the recording data onto a recording tape;

data rate detecting means for detecting the data rate of the input data;

recording tape running drive means for carrying out running control of the recording tape;

thinning control means for thinning-controlling recording operation by the recording head of the rotary head; and recording control means for controlling the recording tape running drive means and the thinning control means in accordance with an output from the data rate detecting means, the recording control means being operative so that when the data rate of the input data is less than a predetermined value, the recording control means controls the recording tape running drive means to decrease running speed of the recording tape, and to control the thinning control means to thinning-control recording operation by the recording head of the rotary head, and the recording control means being further operative so that when running speed of the recording tape changes, and only for a time period until a transient phenomenon caused by the speed change becomes stable, the recording control means conducts a control so as to interrupt recording operation by the recording head of the rotary head.

11. A recording/reproducing apparatus comprising:

an input interface supplied with input data with a data rate from a device external to the apparatus;

input buffer means for temporarily storing input data inputted through the input interface;

signal processing means for converting data read out from the input buffer means into recording data in which address signals are added every predetermined length;

a rotary head provided with a recording head for recording recording data from the signal processing means onto a recording tape and a reproducing head for reproducing recording data on the recording tape;

data rate detecting means for detecting data rate of the input data;

recording tape running drive means for carrying out running control of the recording tape;

thinning control means for thinning-controlling recording operation by the recording head of the rotary head;

reproducing means for allowing the reproducing head of the rotary head to scan at a scanning speed higher than that at the time of recording on the recording tape to cause an output of the reproducing head to be continuous by using the address signal; and recording control means operative so that when data rate of the input data is less than a predetermined value in accordance with an output from the data rate detecting means, the recording control means controls the recording tape running drive means to decrease tape running speed, and controls the thinning control means so as to carry out thinning of recording operation by the recording head of the rotary head for a predetermined time.

12. A recording/reproducing apparatus as set forth in claim 11, wherein the control means is operative so that when running speed of the recording tape changes, the control means delivers, to the signal processing means, speed switching information indicating that running speed of the recording tape has been switched, and wherein the signal processing means forms the recording data from the input data according to the speed switching information.

13. A recording/reproducing apparatus comprising:

an input interface supplied with input data with a data rate from a device external to the apparatus;

input buffer means for temporarily storing input data inputted through the input interface;

signal processing means for converting data read out from the input buffer means into recording data in which address signals are added every predetermined length, said signal processing means having a signal processing circuit for implementing error correction coding processing to data read out from the input buffer means, modulating means for modulating an output signal from the signal processing circuit, and a recording amplifier for amplifying an output signal from the modulating means so as to form the recording data;

a rotary head provided with a recording head for recording recording data from the signal processing means onto a recording tape and a reproducing head for reproducing recording data on the recording tape;

data rate detecting means for detecting data rate of the input data;

recording tape running drive means for carrying out running control of the recording tape;

thinning control means for carrying out ON/OFF control of the recording amplifier to thereby effect thinning-control recording operation by the recording head of the rotary head;

reproducing means for allowing the reproducing head of the rotary head to scan at a scanning speed higher than that at the time of recording on the recording tape to cause an output of the reproducing head to be continuous by using the address signal; and recording control means operative so that when data rate of the input data is less than a predetermined value in accordance with an output from the data rate detecting means, the recording control means controls the recording tape running drive means to decrease tape running speed, and controls the thinning control means to carry out thinning of recording operation by the recording head of the rotary head.

* * * * *